United States Patent [19]

Kershaw

[11] Patent Number: 4,928,006

[45] Date of Patent: May 22, 1990

[54] FLUID COUPLED FIBER OPTIC SENSOR

[76] Inventor: Charles H. Kershaw, 10454 Norton Dr., Houston, Tex. 77043

[21] Appl. No.: 337,965

[22] Filed: Apr. 13, 1989

Related U.S. Application Data

[62] Division of Ser. No. 25,711, Mar. 13, 1987, Pat. No. 4,839,515.

[51] Int. Cl.$^5$ .............................................. H01J 5/16
[52] U.S. Cl. ................................ 250/201.1; 250/231.1; 250/227.25
[58] Field of Search .................... 250/231 R, 227; 350/96.1

[56]  References Cited

U.S. PATENT DOCUMENTS 4,595,830  6/1986  McMahon .................... 250/227
4,703,175  10/1987 Salour et al. .................. 250/227
4,739,161  4/1988  Moriyama et al. ............ 250/231 R
4,749,856  6/1988  Walker et al. ................. 250/231 R Primary Examiner—David C. Nelms

[57]  ABSTRACT

A passive transducer apparatus and method of use for producing a useful output light signal in response to a sensed condition. The sensed condition varies the light emitted from a first fiber optic light conductor that is apparently captured or detected by a second fiber optic light conductor. The light captured by the second or collector fiber optic member is the useful output signal which may be made proportional to the sensed condition. The apparent change in light capture may be caused by a relative change in geometry of the fiber optic members, by variation in the coupling fluid or by an external optical member.

10 Claims, 3 Drawing Sheets

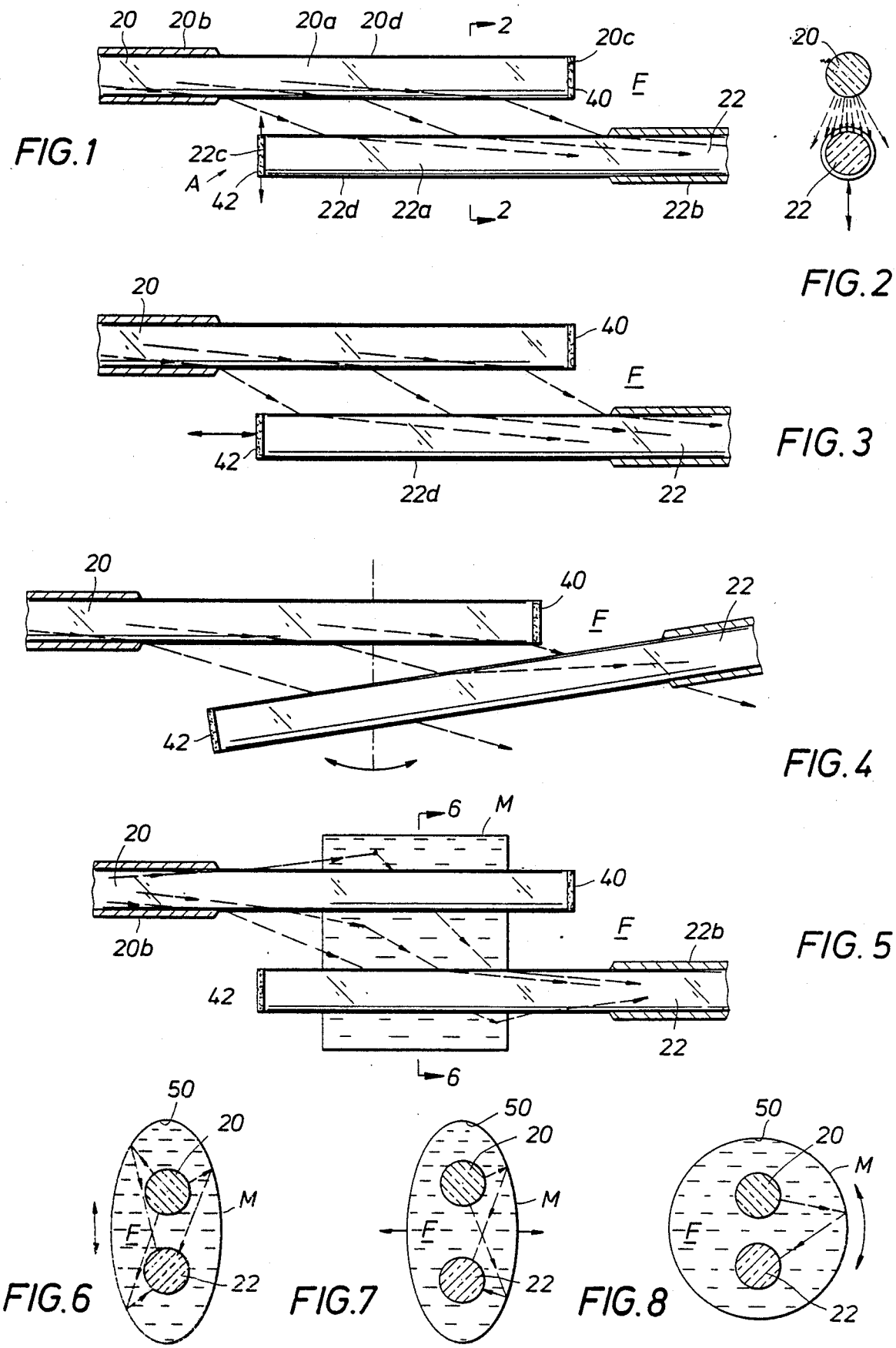

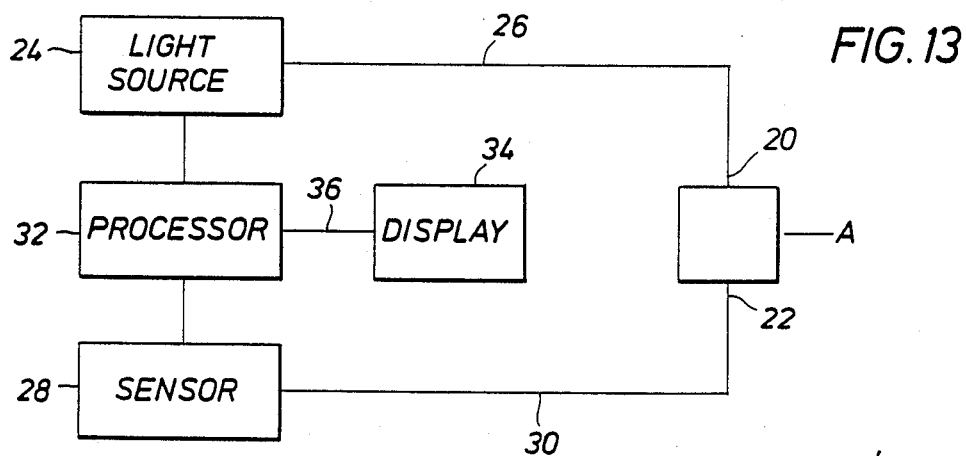
FIG. 13
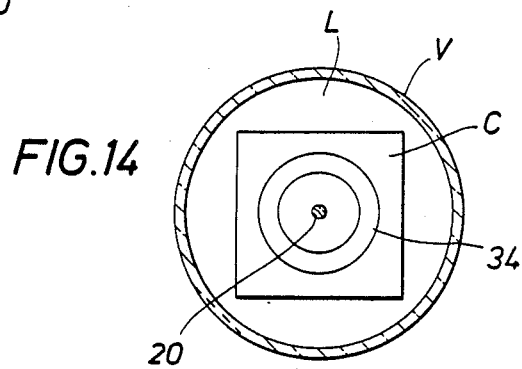
FIG. 14
FIG. 15
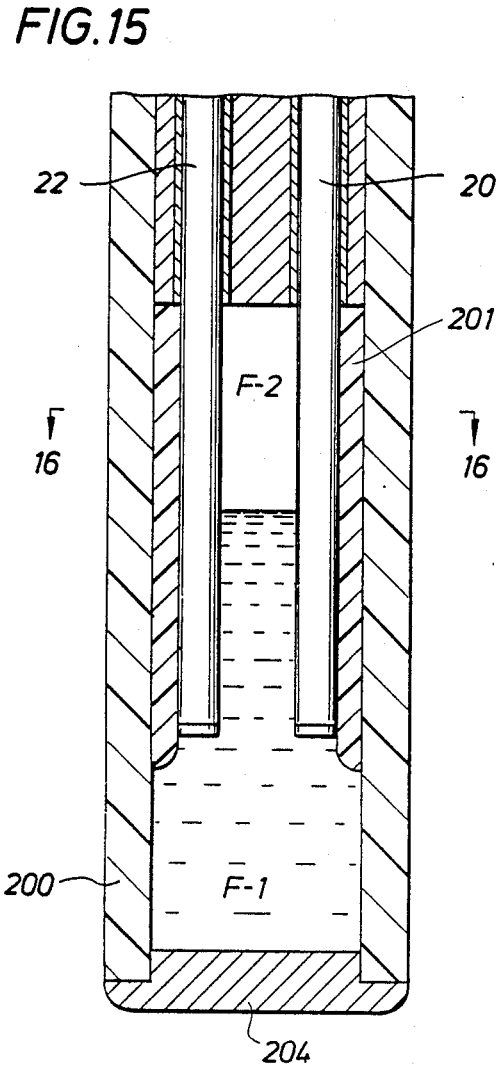
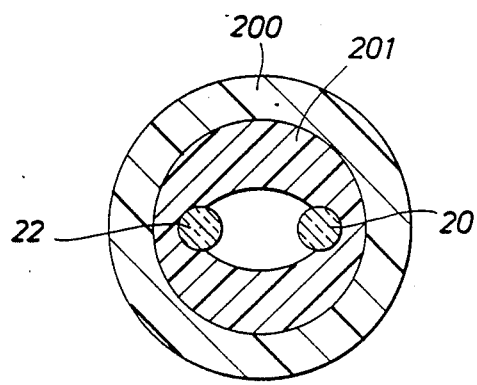
FIG. 16

FLUID COUPLED FIBER OPTIC SENSOR

This application is a divisional of application Ser. No. 025,711, filed Mar. 13, 1987, now U.S. Pat. No. 4,839,515.

FIELD OF THE INVENTION

The present invention relates to the field of transducers and more particularly to a transducer using light energy.

CROSS-REFERENCE TO A DISCLOSURE DOCUMENT

The subject matter of the present application is partially contained in disclosure document No. 155,915 filed Sept. 15, 1986 with the United States Patent and Trademark Office.

BACKGROUND OF THE INVENTION

Light is a form of electro mechanical radiant energy that is detected visually or by appropriate sensors. Light is considered to have a cyclic wave energy pattern and ordinarily move or project in a straight line called a ray. When light energy as an incident ray strikes an object some is reflected, some is absorbed and some is transmitted. Conventionally light travels in a straight line and may be reflected or subject to refraction in the same manner.

Refraction is the recognized scientific principal which causes a bending or change in the direction of the ray or propagation of light as it passes or is transmitted from one light transparent material or medium to another. Such refraction bending is considered completely reversible in as the identical bending occurs in either direction. Both the angles of incidence and refraction (or reflection) are conventionally determined by reference to the normal which is located at right angles to the plane of the interface of the two mediums or materials. In reflection, the angle of light ray incidence is equal to the angle of reflection.

The angular path of the refracted ray is determined by the index of refraction of the material receiving the incidence light ray. The absolute index of refraction of any medium is defined as the index of refraction of the medium relative to vacuum. The absolute index of refraction is usually called just the index of refraction on the refractive index of the medium. The greater the index of refraction the greater the optical density and the greater the angle of bending.

Total reflection is another light energy phenomenon that occurs at the interface of two mediums of different optical density (an optically denser material inherently also has a higher index of refraction). A light incident ray within the denser medium having an incidence angle to give an angle of refraction greater than 90° is totally internally reflected and no light passes into the other medium. The angle of incidence for which the angle of refraction is 90° or normal is called the critical angle. Light at angles of incidence at or greater than the critical angle is totally internally reflected within the denser medium. Total internal reflection can only occur only for light within a medium of higher optical density at an interface surface with a medium of lower density. Although the principle is based on the second law of refraction, the effect is called total internal reflection.

Fiber optics employ the total internal reflection to achieve transmission of light with greater effectiveness and relatively small light loss or attenuation. Fiber optics serve as dielectric optical waveguides or conductors for directing the propagation of light in a selected path. Because fiber optics are basically passive devices (no moving parts) they are durable and simple in operation and therefor highly desirable from a reliability and maintenance standpoint.

Fiber optic sensors using the principle of internal refraction are known. For examples see U.S. Pat. Nos. 3,282,149, 4,286,468 and 4,564,292. All of these determine the amount of light transmitted through a single optic waveguide fiber as a function of the light loss occurring at a selected sensor portion.

U.S. Pat. No. 3,282,149 to Shaw et al. is entitled "Linear Photoelectric Refractometer". The Shaw patent sets forth the then state of the art in some detail including certain mathematical light relationships. In addition, by measuring the transmitted light through a straight transparent rod where the index of refraction of the surrounding material is less than that of the rod, some of the light reflected at angles less than the critical incidence angle and all of the light reflected at angles greater the critical angle will be retained (total reflection) in the rod. By measuring the transmitted light in the rod, the index of refraction of the surrounding material can be mathematically determined. The actual source of light is not critical and good results are obtained from an ordinary heating tungsten illumination element light bulb.

A conventional photodetector system is used to measure the value of the light retained in the rod and generate a suitable responsive electrical signal. Using known apparatus, this electrical signal is processed in a predetermined manner and the desired information is then usefully displayed. The disclosed device of the Shaw patent is used for measuring the index of refraction of a fluid using a helically coil shaped transparent sensing body having at least 360° of curvature and made of a transparent dielectric (electrically insulating) material having an index of refraction higher than that of the substance to be measured. The sensing element shape enables the determination of the index of refraction without the necessity to determine the angle of incidence optically. Such arrangement is particularly desirable if a photoelectric sensor or detector is used to measure the light intensity for making the determination. Because the light intensity in the rod is measured, the presence of color, bubbles or solids in the fluid being measured for refraction does not adversely affect the information generated.

U.S. Pat. No. 4,564,292 to Omet also discloses a portable photoelectric refractometer for measuring the index of refraction of a sample medium. The disclosed device measures the transmission of light through a U-shaped or curved unshielded fiber optic sensor mounted on a probe. As the light transmission is a substantially linear function of the index of refraction greater accuracy and reliability can be obtained in use if the temperature factor can be controlled. To eliminate the potential source of temperature error, a reference U-shaped fiber optic sensor is placed in the probe in contact with a reference fluid along with a similar shaped fiber optic sensor for contacting the fluid being examined. By a suitable delay in making a reading until a common temperature is reached, the potential for measurement error from a temperature difference of the fluids are eliminated.

In U.S. Pat. No. 4,286,468 to Altmen a method and apparatus for sensing or transducing sound wave motion by determination of total light transmitted by an optical fiber is disclosed. This patent, which is entitled "Frustrated Total Internal Reflection Fiber-Optic Small Motion Sensor For Hydrophone Use", discloses a hydrophone transducer for detecting acoustic pressure wave signals in the ocean. The hydrophone transducer operates by sensing a change in the refractive index of the fiber as the acoustical pressure changes. Such changes in refractive index effect a phase delay of the transmitted light which is then measured and compared with a reference to detect the sound waves.

The unclad spiral portion of the Altmet Patent fiber optic sensor is positioned adjacent to a flat plate and the space therebetween filled with a fluid having a low optical loss characteristic and a refractive index lower than the fiber core. Because of the lower refractive index, the transmission of light through the unclad coiled fiber optic sensor is dependent on total internal reflection at the core interface. Also present adjacent the unclad sensor portion is an evanescent light wave field which externally surrounds the sensor. The evanescent light field is made available or created by removing the optical cladding. To the extent that this surrounding light field is intercepted by a material of higher refractive index than the fluid, the total internal reflection is diminished and the apparent light transmission loss of the optic sensor increased. The closer the movable field light interceptor plate moves to the fiber optic sensor the greater the apparent loss of light. Because the plate frustrates the otherwise total internal reflection of the fiber optic sensor, this type of modulation phenomenon is sometimes called "frustrated total internal reflection". The resulting change in the phase, not intensity, of the fiber optic transmitted light can be measured and displayed using conventional techniques.

Another group of fiber optic devices uses a liquid core having a quartz cladding. By modifying the refractive index of the liquid core to vary the amount of light entering into or escaping from the core a useful feature is obtained. Examples of such devices are disclosed in U.S. Pat. Nos. 3,819,250 and 4,201,446.

Kibler U.S. Pat. No. 3,819,250 is entitled "Temperature Sensitive Fiber-Optic Devices" and discloses three embodiments of a low light loss fiber optic coupler invention. The embodiment of FIG. 1 is a wide aperture coupler while the embodiment of FIG. 3 is a directional light coupler. FIG. 2 is a small radius bend guide coupler used to reduce light loss. All three embodiments utilize a temperature control to enhance effectiveness of the device. The reversible wide opening or aperture coupling enables the quartz cladding to introduce light into the liquid core at a large critical angle in the heated region. The light accepting property of an optical fiber is normally called the numerical aperture and often limits the amount of transmitted light captured. The numerical aperture, a mathematical measure of the light-accepting property of the sensing fiber optic core is controlled by the temperature of the coupling fluid. In the embodiment of FIG. 1 the disclosed fiber optic sensors employ a quartz cladding or coating and a dielectric liquids to enhance the light accepting or radiating coupling.

The normal light loss in the bend coupler (FIG. 2) is reduced by cooling the core and cladding to increase the difference in refractive index and increase the total internal reflection.

The directional coupled embodiment (FIG. 3) employs two parallel quartz fiber optic rods embedded in a dielectric coupler liquid (carbon tetrachloride). While structurally similar to the present invention, the disclosed function, operation and purpose are entirely different. Controlled temperature variations of the disclosed coupler structure will transmit or couple different amounts of refracted light between the two rods due to the relative change in the indices of refraction of the liquid and the quartz rods. With this arrangement the amount of light coupled from one rod to the other is determined by the external temperature controller.

U.S. Pat. No. 4,201,446 to Geddes et al. discloses a fiber optic sensor device for determining an unknown temperature. The disclosed sensor is a liquid-core optical fiber contained in a transparent glass capillary tube that is mounted in a conventional single fiber optic conductor at a desired remote sensing location. The liquid core of the sensor portion has a temperature dependent index of refraction over a given temperature range. The numerical light aperture of the disclosed photoelectric electric sensor varies continuously from zero to the maximum value sensed by the fiber optic sensor. In another embodiment a conventional unclad fiber optic core is immersed in a liquid having a temperature sensitive refractive index.

Fiber optic core interconnection is known and essential for commercial operation whether classified as a connector, a splice or a coupler. Splices are usually considered to be fusion or other permanent end-to-end joints between the cores of two separate fibers. Connectors are usually considered to be demountable interconnections while couplers are usually considered optical connectors that redistribute particularly light energy between two or more fibers. Collectively all of these devices seek to connect separate fiber optic fibers with a minimum of attenuation or loss of light.

Also, fiber optic couplers have been devised using a liquid medium to couple light from one fiber to another either from butt end to butt end or from unclad core to unclad core via the cylindrical surfaces. See, for example previously mentioned U.S. Pat. No. 3,819,250 (FIG. 3 and description at col. 4 lines 40–56) regarding an external temperature controlled directional light coupler. As noted previously the coupling relies on external temperature control of the fluid to a change the refractive index to permit light transmission.

The basic transduction mechanism employed in many known fiber optic sensors is the phase modulation of coherent light guided through a section of single mode fiber by the action of a detected energy field. Chapter 4 of the publication entitled "Fiber Optic Sensor TECHNOLOGY HANDBOOK" published by Dynamics Systems, Inc. describes the known forms or configurations currently employed in fiber optic sensors. A common aspect of the mentioned transducers or sensors is the splitting and recombing of the light beams to determine a light phase shift for measuring the condition with such transducers.

SUMMARY OF THE INVENTION

The present invention relates to the field of a transducer using a light energy signal output and employing a pair of fiber optic light waveguide conductors operably coupled by a selected coupling fluid. Under operating conditions a reference or base intensity conical pattern of light is transferred through the coupling fluid from the emitting fiber optic conductor to the receptor fiber optic conductor. The sensed physical condition of the transducer varies the light intensity transferred to or apparently detected by the receptor fiber optic conductor from the emitter fiber optic conductor. The condition sensed may vary the transmitted light by effecting an actual or operating change in relative position of either or both fiber optic waveguides or of the coupling fluid or fluids. Actual or relative movement of external members may also be used to vary the transmitted light received by the receptor or light collecting wave guide. The physical condition sensed may be used to modify the coupled light path in any desired manner to produce an apparent change in light intensity. This apparent change in light intensity of the detector fiber optic member is the transducer output signal that may be measured by known light detector apparatus and the change in transducer sensed condition determined by conventional processing in suitable electrical or electronic means of the received measured signal.

BRIEF DESCRIPTION OF THE DRAWINGS

FIG. 1 is a side view, in section, of a first embodiment of the transducer apparatus of the present invention having a pair of spaced fiber optic light conductors showing a coupling light path between the conductors;

FIG. 2 is a view taken along line 2—2 of FIG. 1;

FIG. 3 is a view similar to FIG. 1 showing another manner of modification of the light path between the fiber optic conductors;

FIG. 4 is a view similar to FIG. 1 with the fiber optic light conductors angularly disposed and showing the light path between conductors;

FIG. 5 is a view, similar to FIG. 1, of a modified form of the present invention having an external light path control member;

FIG. 6 is a view taken along line 6—6 of FIG. 5.

FIG. 7 is a view similar to FIG. 6 showing different light paths between the fiber optic light conductors.

FIG. 8 is a view similar to FIG. 5 of another form of the external light path control member;

FIG. 13 is a schematic view of a sensor system using the apparatus A of the present invention;

FIG. 14 is a view taken along the longitudinal axis of a fiber optic conductor showing the emitted light pattern;

FIG. 15 is a side view in section of another embodiment of the present invention; and FIG. 16 is a view taken along line 16—16 of FIG. 15.

DESCRIPTION OF THE PREFERRED EMBODIMENT

Figure 12:
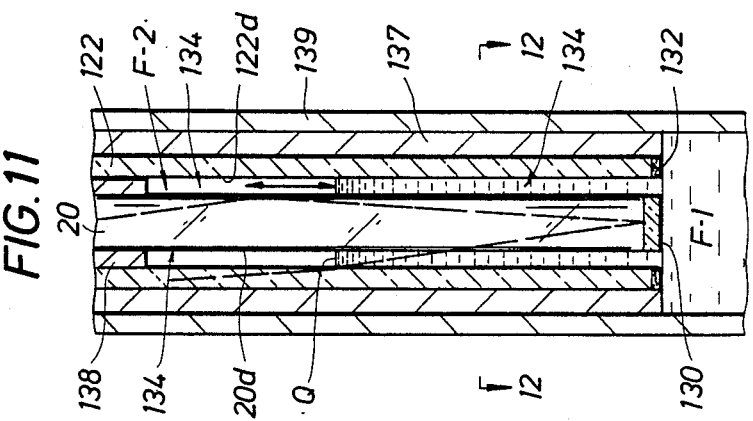
FIG. 12 is a view taken along lines 12—12 of FIG. 11.

FIGS. 1 and 2 illustrates a preferred embodiment of the transducer or condition sensor apparatus of the present invention, generally designated A. As used herein the term transducer is to be considered in its broadest sense of detecting a condition or of the conversion of any physical variable into a useful output signal. By way of example, but not in limitation, the conditions sensed by the apparatus A include temperature, pressure, index of refraction, movement (strain) and so forth. Those skilled in the art ill immediately appreciate the unlimited possibilities for packaging the present invention as a sensor or transducer A for monitoring any condition.

As illustrated in FIG. 1, the sensor or transducer apparatus A includes a first, source or emitter fiber optic member or light waveguide 20 and a second, target or receptor fiber optic member or waveguide 22 optically coupled by a suitable fluid generally designated F. The fiber optic members 20 and 22 are employed or utilized as conventional optical waveguides for highly efficient transmission of light into and through the sensor apparatus A. The exact structural support arrangement of the members 20 and 22 and containment chamber (not illustrated) for the fluid F ar well within the level of skill in the art and may be left to each specific application. The transducer apparatus A produces a useful output signal with the light apparently captured by the target fiber optic member 22 with the sensed physical variable controlling the intensity of the light apparently captured. Either or both of the fiber optic members 20 and 22 may be coupled directly with other fiber optic members to form a conventional desired light guide path to and from the apparatus A.

As illustrated in FIG. 13, the sensor apparatus A is preferably employed in a physical condition detector system, generally designated S. The system includes a conventional fiber optic light source 24 that is optically coupled to the fiber optic conductor 26 which is operably interconnected with fiber optic light emitter member 20. With this arrangement the light output of the source 24 is present in the emitter member 20. A suitable light sensor 28 is optically coupled with fiber optic conductor 30 that is interconnected with receptor fiber optic member 22 of the apparatus A. The light captured by the receptor member 22 is thus present or detectable by the sensor 28. This arrangement also enables the sensor apparatus A to be located remotely relative to the other components of the detector systems which are preferably located in a protective environment.

The detector system S includes a suitable conventional electrical or electronic processor 32 which receives signals from both the source 24 and sensor 28. With these two input signals the previously calibrated processor 32 automatically determines the condition sensed by the apparatus A and displays or records such information on suitable connected known display apparatus 34. The output signal of the processor 22 is transmitted to the display apparatus through conductor 36 and which may also be connected to a controller (not illustrated) of the condition sensed by the apparatus A to form a conventional automatic feedback controller or servo arrangement (not illustrated). The feedback controller automatically adjusts the operation to maintain the condition sensed by the apparatus A at a desired level or range.

The fiber optic members 20 and 22 may be selected from many of the now commercially available conductors having a wide range of properties, operating conditions and the like as well known to those skilled in the art. The actual operating conditions of the apparatus A will in all likelihood determine the actual selection of the most suitable fiber optic members. In general, such fiber optic members 20 and 22 have a central cylindrical conductor core 20a or 22a having a relatively thin cladding or external coating 20b or 22b formed or deposited thereon, as illustrated in FIG. 1. While the present invention will be described as a cylindrical core waveguide for member 20 and 22, it will be understood that those skilled in the art may employ waveguides of other than circular cross section. For example, optical fiber ribbons or of rectangular cross section may be selected. The cladding 20b and 22b normally serve to protect the cores and prevent attenuation or loss of the transmitted light signal from the conductor core 20a and 22b. The cladding 20b and 22b is normally an optically transparent material, with a reflective index lower than the core 20a or 22b, placed exteriorly or outside the core material of an optical waveguide that serves to reflect or refract lightwaves in order to confine the light to the core.

In order to form the coupling light path between the members 20 and 22 the exterior surface cladding of each is stripped or removed for a predetermined distance of, perhaps, one centimeter, and each core end 20c and 22c is cleaved. The term cleaving is used in its conventional sense in this art as meaning the shaping of the core end to an optically flat surface. Even with the cleaved ends 20c and 22c, light will escape or radiate from the unclad portions or windows 20d and 22d formed on the members 20 and 22, respectively. The cleaved ends 20c and 22c may then be coated, as desired, with either a highly reflecting substance or non-reflecting, substance or opaque end caps 40 and 42 to insure no light or light beam will escape or enter from the cleaved ends 20c and 22c.

The other end (not illustrated) of the fiber optic member 20 is then coupled either indirectly by conductor 26 or directly to a light source 24 and the first end 20c dipped into a suitable calibration vessel V (FIG. 14) having a quantity of clear light coupling liquid of known refractive index higher than that of the core 20c to avoid total internal reflection. The end 20c is then immersed for a desired distance or depth of, perhaps, one half centimeter in the liquid L. If desired the entire window 20d may be immersed in the liquid L. A white calibration card C is also disposed in the liquid L a certain distance or depth below the end 20c *l and at right angles to the longitudinal axis of the fiber optic core 20a*. It will then be seen from FIG. 14 that a cone shaped light pattern has escaped from the fiber core periphery forming a concentric circular light ring pattern 34 on the white card C. That the radiated light from the window 20d is a hollow cone of light 34 can be shown by changing the depth of the white card C without changing the amount of depth of fiber immersion. The angle of the cone shape light pattern 34 is determined by the refractive index of the liquid L which may or not be the same as that of the coupling fluid F. If conductor cores of other shapes are employed or the window 20d is formed differently, the pattern 34 will have a different shape. But any certain pattern may be used in the present invention. The light ring 34 display verifies both the absence of voids or holes in the light pattern 34 transmitted through window 10d and the angular relationship.

The calibration and verification of the receptor fiber optic member 22 can be accomplished in the identical manner because of the reversible direction path property of light. By reversing the system S connections the emitter and receptor members 20 and 22 may, if some embodiments of the apparatus A, be interchanged in use.

After verification of the proper angular and homogeneous density of the light path through windows 20d and 22d the fiber optic member 20 and 22, are assembled in the apparatus A in the various positional relationship illustrated in order that the liquid emitted from window 20d is directed by the coupling fluid F to strike the window 22c to enable at least some of the light to be captured in the core 22a.

In FIG. 1, and the other Figures, the communicating light coupling path between and internally of members 20 and 22 and coupling fluid F is illustrated by unreferenced light ray arrows. FIG. 2 illustrates the radial intersection of the light field rays produced by emitter conductor member 20 by receptor conductor member 22. The dotted light rays within receptor member 22 indicates the internal refractive guide path of the light captured through window 22d by controlled placement or relative position of the members 20 and 22. The dotted line light rays internally of member 20 illustrated the portion of the light path prior to radiation through window 20d. It will be understood that various intermediate reflective and refractive surfaces (not illustrated) may be used to control the light paths without departing from the scope or operation of the present invention.

The angle of this illustrated light cone depends on the difference of refractive index between the fiber cores 20a and 22a and the liquid L, on the Numerical Aperture of the fiber core 20a, assuming multimode, and finally, on the beam spread of the light generated by source 24. For a particular case, this angle may range up to 25 degrees. By the principle of reversibility of light propagation the adjacent collector fiber optic member 22 may receive or collect and then transmit this same light to the optical detector 28 for measurement.

By varying the geometrical light path relationship between the fiber optic source member 20 and receiver member 22 we can obtain an intensity variation of the transmitted light between fibers 20 and 22. Such variation in geometry or relative position can be accomplished by any number of suitable means. For example, an external physical variable can be used to alter the geometrical light transfer relationship and in so doing constitute a transducer of that physical variable into a proportional output signal.

In FIG. 1, three light ray paths are illustrated from the window 20d of the emitter member 20 to the collector member 22. The middle ray represents the approximate center of the light path in the illustrated plane while the two outer rays represent the approximate outer edges of the conical ring like lighted zone emitted by member 20. In the plane of FIG. 2 the angled radial projection of the light rays from member 20 to the receptor member 22 is illustrated while FIG. 14 illustrates the light pattern 34 from the window 20d. Relative movement of the member 22, while maintaining the parallel relationship with member 20, radially toward the member 20 as indicated by an arrow adjacent end cap 42 will increase the number of light rays or light intensity captured by the collector window 22d of the receptor member 22. Likewise, the relative spacing movement of the parallel disposed collector member 22 away from the emitter member 20 will reduce the intensity of the light signal captured by the collector window 22d. By the apparatus A securing the member 20 to a fixed support and the member 22 to a variable position support, the relative position of the members 20 and 22 can be determined as well as the change in position by the light intensity sensed by calibrated detector 28. An example by way of description and not limitation of the use of the embodiment of FIG. 1 would be in transducing the relative distance, positioning or spacing between operating machine parts. In this application, the apparatus A needs only to be arranged such that the monitored condition effect some parallel spacing reciprocation of the collector member 22 to produce a proportional output signal.

The arrow adjacent the end cap 42 of the collector 22 in FIG. 3 illustrates longitudinal reciprocation movement, in either direction, of the receptor member 22 for also varying the window 22d effectively exposed to the light emitted from member 20. In this embodiment the parallel spacing is constant, but longitudinal movement of the collector 22 varies the light collectible by window 22d. An example of the use of the embodiment in FIG. 3 again by way of description and not limitation wold be reciprocating movement of a valve stem (not illustrated) of a remote valve. Such stem could also be mounted on a fluid pressure sensing diaphragm for determining fluid pressure conditions. While movement of the parallel disposed collector member 22 has been illustrated and described, it will be understood that any relative movement or change in positional or geometric relationship of 20 and 22 is all that is required to effect a change in the light detected by window 22d of collector 22. Such effect, function or result can also be achieved by actual physical movement of either the emitter 20 or the collector 22.

Such effect can also be achieved by a change in a relative angular or geometric relationship of the member 20 and 22 as illustrated in FIG. 4. In this figure, the arrows indicate relative rotary or swinging motion between the members 20 and 22. A slight change in the angle of incident light rays on the collector window 22d, under certain conditions, can have a major proportional change in the captured light intensity. The transducer could thus serve as a rotational movement sensor or misalignment detector. Such angular movement could be created by pressure, temperature, gravity or other physical condition by suitable arrangement.

It will be appreciated that any relative physical movement between the member 20 and 22 that will vary the geometric relationship therebetween will also vary the light apparently or actually transmitted into receptor member 22 which can be detected as a proportional light signal indicator of such movement. Because of the extremely short wave lengths of light energy, an extremely sensitive transducer A for converting such movement into light energy is provided.

Equally significant is the ability to sense an apparent relative movement or change in transmitted light caused by the coupling fluid or fluids. In the embodiments of FIGS. 1-3, a single, contained, common coupling fluid F having a known uniform index of refraction is described. Other known light directional control means, such as reflecting mirrors, refracting prisms or shutters may be positioned in the coupling light path provided by the fluid F. In such cases, the liquid refractive index is maintained constant and the entire light path geometry is immersed in the coupling fluid. The suggested modification of the light path by such directional control means employs recognized techniques known to those skilled in the art and need not be set forth in detail.

In a second disclosed type of arrangement of the apparatus A, the emitter and receptor members 20 and 22 we assume a constant physical geometry (passive operation) and are coupled by a fluid of known refractive index but the coupling fluid interface with another or second fluid of a second refractive index is moved along the unclad fiber windows 20a and 22d. The second fluid provides a different coupled light path so the transmitted and captured light is proportional to or a function of the interface location. In essence, the second fluid serves as an shield or shutter.

Figure 9:
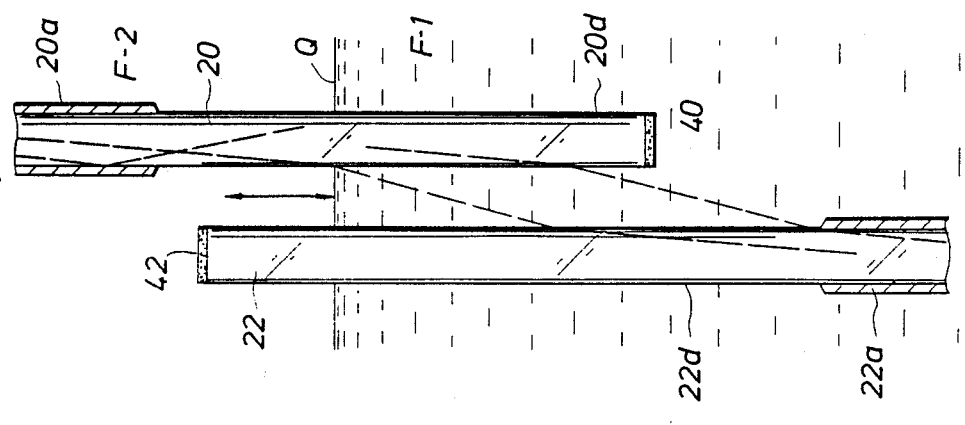
FIG. 9 is a side view, in section, of another form or embodiment of the present invention.

In FIG. 9, a preferred embodiment having a physical geometry relationship of the members 20 and 22 similar to that of FIG. 1 is disclosed. The emitter fiber optic wave guide member 20 is fixed in position relative to the receptor member 22 by the apparatus A in any conventional manner. In this embodiment, two coupling fluids $F_1$ and $F_2$ are employed. The fluid $F_1$ is preferably a liquid to insure separation from fluid and formation of a distinct fluid interface Q with the second $F_2$ which is preferably a vapor phase or gas having a different refractive index from that of liquid $F_1$. However, any two fluids which will constantly maintain an interface or level without intermixing may be employed. The fluid $F_2$ is preferably not an optical coupler of the members 20 and 22 and therefor serves as a shutter or shielding for the receptor member window 22d. If the fluid $F_2$ is a coupler, the window 22d should be positioned so that the index of refraction prevents light transmission or communication. Air is not a good coupling fluid which makes the embodiment of FIG. 9 attractive for use as a liquid level sensor open to the atmosphere liquid storage tanks. With the optical coupling of the members 20 and 22 is being done solely by the fluid $F_2$ operably serving as a light shutter, the position of the interface Q may be easily determined by the apparatus A. When the fluid $F_1$ is at the level or interface Q illustrated in FIG. 9, the edges of the radiated and receivable light pattern or field is bounded by the dotted lines. As the level or interface Q moves or varies from that illustrated, the size of the communicated light field or quantity of light coupled by the fluid $F_1$ varies proportionally. The light quantity or intensity sensed from member 22 is thus a function of the location of the level or interface Q of the fluid $F_1$.

It is understood that the case or housing (not illustrated in this embodiment) enclosing the apparatus A prevents stray or spurious light, not from light conductor 20, entering receptor 22. The use of the embodiment of FIG. 9 as a fluid level sensor or detector apparatus A will be readily apparent to those skilled in the art as noted above. In addition, this embodiment may be used to determine or sense fluid pressure by arranging the fluid system $F_1$ and $F_2$ to vary the interface level in response to a pressure. This may be accomplished in any known manner or way. For example, any compression (increased pressure) of contained fluid $F_2$ will effect a change in the level or interface Q by liquid $F_1$ and which change varies the coupled light. In this embodiment the light transmission geometric relationship of the member 20 and 22 is varied solely by the change in level of the coupling fluid $F_1$ and the apparatus A is entirely passive in operation. The windows 20d and 22d can be of any desired length to monitor movement of interface Q through any preselected range of coupling fluid $F_1$. The roles of the members 20 and 22 may also be reversed.

Figure 10:
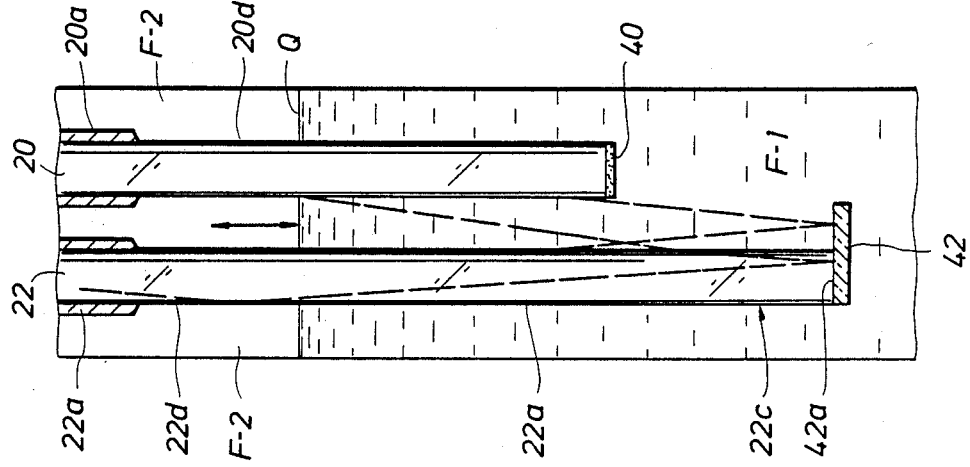
FIG. 10 is a view similar to FIG. 9 of still another form or embodiment of the present invention.

FIG. 10 discloses another embodiment of the present invention that is similar to the embodiment of FIG. 9 in that the wave guides 20 and 22 are fixed in physical relationship and the effective level of coupling fluid $F_1$ varies the apparent optical relationship. In this embodiment, the end cap 42 of the receptor member 22 is modified to extend outwardly to provide a light reflective surface 34a with the end cladding 22c made optically transparent to capture the reflected light from mirrored surface 34a. It is understood that the window 22d may have a replacement cladding 20c, 22c, of refractive index equal to or greater than that of the core 20a, 22a, for physical strength and light transmission. The light path emitted from the window 20d of member 20 is contained within the dotted line path as previously described. A portion of the light emitted from the window 20d first strikes the reflective surface 42a where they are reflected back toward the window 22d of the collector member 22. Some of this reflected light is refracted or captured and transmitted through the core 22a. Some of the light from window 20d is refracted or directly captured in receptor member 22 and then reflected by mirror surface 42a back to the sensor 28. In either coupled light path, the captured light in reflected by mirrored surfaces 34a, 42a in the opposite direction to that of member 20.

As the size of the fluid coupled emitting window 20d of the member 20 is controlled by the interface level of the fluid $F_1$ the light made available for detection is a function of the position of the level or interface Q of fluids $F_1$ and $F_2$. One advantage of the arrangement of the embodiment of FIG. 10 is the compactness of the apparatus A in supporting both of the fiber optic members 20 and 22 at a common end. This is a highly desirable commercial feature or aspect and may be equally desirable in any form or embodiment of the apparatus A of the present invention.

Figure 11:
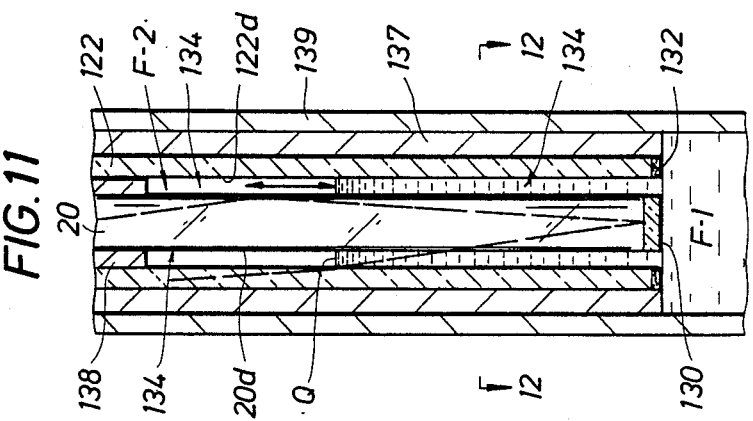
FIG. 11 is a side view, in section, of another embodiment of the present invention.

FIG. 11 is yet another embodiment of the apparatus A of the present invention arranged in another commercially desirable form. In this embodiment, the emitter member 20 is concentrically disposed within and adjacent the sleeve like collector member referenced in this embodiment as 122. Also in this embodiment, the relative positions of the member 20 and 122 is fixed, but in a concentric relationship. The ring-shaped end member 142 of the collector member 122 is reflective (mirrored) to light-in member 122, but opaque to prevent spray or random light entry through end 122c (Due to the differing cylindrical shape, reference character 122 is used to identify this receptor member with the suffix letter reference character used to designate like parts of member 22). The fiber optic members 20 and 122 are compactly mounted in a cavity 123 formed in an external transducer housing 137 and fixed in the spaced concentric operating relationship by mutual cladding and spacing material 138. The cylindrical member 137 also may serve as the outer cladding for core 122. A cylindrical member 138 may be mutual cladding for core 20 and cylindrical core 122. The housing 139 is formed of any convenient size, shape and configuration for appropriate mounting with a suitable cladding 137 adjacent and in communication with the specific condition being sensed. Furthermore, the detailed manner of arranging, manufacturing, sealing, calibrating, assembly and installation of any transducer apparatus A, as well as the preferred materials of construction, are well known to those skilled in the art and need not be detailed herein. The light collector window 122d in this embodiment is provided by the cylindrical inner surface located adjacent the window 20d of the emitter 20. As the level or interface Q of coupling fluid $F_1$ rises, larger proportional light communicating areas of the windows 20d and 122d are optically coupled for communication more light therebetween. To enhance such light communication or capture, the end member 130 of the emitter member 20 and end member 142 of collector member 122 may be made internally reflective or mirrored in order that light will be coupled in the light ray path illustrated. Not only may the interface Q be sensed, but by suitable arrangement of an expansible chamber (not illustrated) containing the fluid $F_1$ other conditions, such as pressure or temperature, may be sensed and converted into meaningful proportional or indicator light signals.

FIGS. 15 and 16 illustrated an embodiment similar to that of FIG. 11, but employs the two separate, substantially identical fixed fiber optic 20 and 22 used in FIG. 1. This embodiment employ a flexible tubular outer wall forming a protective housing 200 for the apparatus A. The fiber optic members 20 and 22 are secured within the housing 200 in a fixed parallel spaced apart relationship by a curable cement 201. The coupling fluid F-1 level in chamber 202 serves to optically communicate the window 20d and 22d in the manner previously described. As the interface Q moves along the window 20d and 22d a varying proportion of light is coupled or communicated. A flexible diaphragm 204 or other suitable chamber closure may be used to maintain the optical fluid F-1 operably adjacent windows 20d and 22d.

The embodiment of FIG. 5 illustrates the apparatus of the present invention utilizing an external member M mounted with the apparatus A in a suitable manner to vary the light transmitted from the emitter member 20 through the coupling fluid F to the receptor member 22.

The external member M may be of the type described in U.S. Pat. No. 4,286,468 to Altmen relating to the hydrophone (acoustical pressure or sound wave transducer) which decreases or refracts the transmitted signal. Such decrease or attenuation of the transmitted light may be utilized with the present invention when properly calibrated. Preferably the external member M, is tubular shaped and supported in any conventional known manner in essentially a concentric surrounding relationship to the members 20 and 22. The inner surface 50 of the member M is formed optically reflective or mirrored for reflecting the incident light rays from the emitter 20 back to the collector 22. Preferably the member M is given an elliptical cross-section (FIGS. 6 and 7) or an circular cross-section (FIG. 8) to focus the reflected light from the mirrored surface 50 on the collector window 22d in the known manner. A light ray blocking shutter or shield (not illustrated) may be positioned to block any direct light path from the emitter 20 to the collector 22 to enhance the operating effect of the member M. When the fiber optic members 20 and 22 are optically centered as illustrated in FIGS. 6 and 7, the parabolic shaped halves of the member M form the radiating light ray path from the emitter 20 on the collector 22. As the member M moves relatively to the members 20 and 22 in the direction of the arrows in either FIGS. 6 or 7, the light rays formed by the reflection surface 50 are not longer properly focus or incident on the collector 22 and the apparent collected light intensity decreases. Such decrease is proportional to the movement of the member M and can also be measured by the sensor 28.

In this embodiment, the fiber members 20 and 22 remain fixed (passive) in geometry while the member M moves to vary the sensed light. The movement of the member M can be made proportionally responsive to the condition being detected, such as pressure or temperature using conventional techniques. It is not essential that member M move in the exact manner illustrated to produce a measurable change in the measured light intensity. A change in the cross-sectional shape of the member M will also create a misfocus or astigmatism type distortion of the focus to provide a proportional apparent decrease of light intensity in the collector 22. Because the coupling fluid F may be selected from either substantially incompressible to highly compressible silicone based liquids, hydrophones capable of operation at great depths without pressure compensation are possible.

FIGS. 1 through 4 show embodiments in which the physical geometry of the fiber optic members may be varied or modified in order to proportionally vary the amount of light transmitted to the collector. FIGS. 5 through 8 show embodiments in which an external member proportionally varies the light sensed by the collector. FIGS. 9 through 12 and 15 and 16 show embodiments with fixed fiber optic geometry and a coupling fluid that varies the amount of light transmitted to the collector.

FIGS. 1 through 5 show fiber optic members arranged for light passage in the same direction while FIGS. 10 and 11 show opposite direction light paths.

In addition to providing a proportion output signal, the apparatus A may also be employed as part of an actuation signal or alarm system to indicated either a desired or undesired operating condition. Again, for example and not limitation, the absence of coupling fluid from the apparatus A caused by the existence of a low level condition may be used to trigger an alarm due to the decrease in apparent light collected. Either the presence or the absence of a certain strength of apparent light signal in the collector member may be used as the trigger signal. Thus the apparatus may be used as an indicator of a condition (a non-proportional signal) as well as providing a proportional output signal. Such applications are virtually limitless in possibilities of use.

Each of the U.S. patents identified previously are included herein by this specific reference to form a portion of this disclosure as if set forth in full.

The foregoing disclosure and description of the invention are illustrative and explanatory thereof, and various changes in the size, shape and materials, as well as in the details of the illustrated construction, may be made without departing from the spirit of the invention.

What is claimed is:

1. A method of using a transducer to determine a sensed condition, including the steps of:
   transmitting a light signal through a first fiber optic conductor;
   emitting at least a portion of the light signal from a side window means in a first fiber optic conductor to contact a light reflective surface means;
   coupling optically the first and second fiber optic conductors with a preselected fluid medium;
   capturing at least a portion of the emitted light signal from the first fiber optic contacting said light reflective surface with a second fiber optic conductor;
   transmitting the light signal captured by the second fiber optic conductor through the second fiber optic conductor;
   sensing a value for the light signal conducted through the second fiber optic conductor; and
   determining the condition sensed by comparing the sensed value for the light signal conducted through the second fiber optic conductor with a reference value;
   changing the relative position of an external the light reflective surface means in response to the sensed condition to proportionally control the captured portion of the emitted light signal.

2. A method of using a transducer to determine a sensed condition, including the steps of:
   transmitting a light signal through a first light conductor;
   emitting at least a portion of the light signal from the first light conductor to contact a light-reflective surface means;
   capturing at least a portion of the emitted light signal from the first light conductor contacting the external surface of the optical member with a side window mans of a second light conductor;
   transmitting the light signal captured by the second light conductor through the second light conductor;
   sensing a value for the light signal conducted through the fiber optic conductor; and
   determining the condition sensed by comparing the sensed value for the light signal conducted through the second light conductor with a reference value;
   coupling optically the first and second light conductors with a preselected fluid medium; and
   changing the relative position of the light reflective surface means in response to the sensed condition to proportionally control the captured portion of the emitted light signal.

3. A transducer apparatus for producing a useful output light signal in response to a sensed condition, including:
   a housing adapted for placement in operable communication with the condition to be sensed and having first and second fiber optic members operably mounted therewith;
   means for optically connecting said first fiber optic member with a source of light;
   means for optically connecting said second fiber optic member with an appropriate light sensor;
   said first fiber optic member having a side windows means for emitting a predetermined light pattern;
   said second fiber optic member having means for capturing at least a portion of the light emitted from the first fiber optic member for transmitting to the light sensor; and
   means for varying the light collected by the second fiber optic member in response to the sensed conditions being transduced to provide a useful output signal;
   said housing forming a chamber for receiving a coupling fluid having a preselected index of refraction for directing the emitted light in a desired path for capture by said second fiber optic member;
   said means for varying provides a proportional change in the light collected by said second fiber optic member in response to a change in the sensed condition to provide a useful range of output signals; and
   said means for varying including light directional control means mounted with said housing and operably disposed in the emitted light path between said first and second fiber optic members for moving in response to the sensed condition to vary the emitted light collected by said second fiber optic member.

4. A transducer apparatus for producing a useful output light signal in response to a sensed condition, including:
- a housing adapted for placement in operable communication with the condition to be sensed and having first and second light conductor members operably mounted therewith;
- means for optically connecting said first light conductor member with a source of light;
- means for optically connecting said second light conductor member with an appropriate light sensor;
- said first light conductor member having means for emitting a predetermined light pattern;
- said second light conductor member having a side window means for capturing at least a portion of the light emitted from the first conductor member for transmitting to the light sensor; and
- means for varying the light collected by the second light conductor member in response to the sensed conditions being transduced to provide a useful output signal;
- said housing forming a chamber for receiving a coupling fluid having a preselected index of refraction for directing the emitted light in a desired path for capture by said second light conductor member;
- said means for varying provides a proportional change in the light collected by said second light conductor member in response to a change in the sensed condition to provide a useful range of output signals; and
- said means for varying including light directional control means mounted with said housing and operably disposed in the emitted light path between said first and second fiber optic members for moving in response to the sensed condition to vary the emitted light collected by said second light conductor member.

5. A light coupler, including:
- a first dielectric waveguide for emitting a light signal, said first dielectric having a means for emitting the light signal in a predetermined path;
- a second dielectric waveguide having side window means for receiving the light signal emitted by said first dielectric waveguide, said second dielectric waveguide having a side window for receiving the light signal;
- a coupling fluid of preselected refractive index for optically coupling said first dielectric waveguide with said second dielectric waveguide; and
- means, disposed in the path of the light signal emitted from said first dielectric waveguide, for controlling the light path direction between said first and second dielectric waveguides in response to a sensed condition by changing the position of said means for controlling the light path direction between said first and second dielectric waveguides to control the emitted light collected by said second waveguide.

6. The light coupler of claim 5, wherein:
said first and second dielectric waveguides are operably fixed relative to each other.

7. The light coupler of claim 5, wherein:
said first and said second dielectric waveguides are operably movable relative to each other.

8. A light coupler, including:
- a first dielectric waveguide for emitting a light signal, said first dielectric having a side window means for emitting the light signal in a predetermined path;
- a second dielectric waveguide having means for receiving the light signal emitted by said first dielectric waveguide;
- a coupling fluid of preselected refractive index for optically coupling said first dielectric waveguide with said second dielectric waveguide; and
- means, disposed in the path of the light signal emitted from said first dielectric waveguide, for controlling the light path direction between said first and second dielectric waveguides in response to a sensed condition by changing the position of said means for controlling the light path direction between said first and second dielectric waveguide to control the emitted light collected by said second waveguide.

9. The light coupler of claim 8, wherein:
said first and said second dielectric waveguides are operably fixed relative to each other.

10. The light coupler of claim 8, wherein:
said first and said second dielectric waveguides are operably movable relative to each other.

* * * * *